US010239076B2

(12) United States Patent
Fontaine

(10) Patent No.: US 10,239,076 B2
(45) **Date of Patent: *Mar. 26, 2019**

(54) PERISTALTIC PUMP AND TRAILER MOUNTED SELF PUMPING SPRAYER SYSTEM INCORPORATING SAME

(71) Applicant: CHAPIN MANUFACTURING, INC., Batavia, NY (US)

(72) Inventor: James R. Fontaine, Marilla, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,195

(22) Filed: Dec. 23, 2016

(65) Prior Publication Data

US 2017/0106384 A1 Apr. 20, 2017

Related U.S. Application Data

(63) Continuation of application No. 14/170,138, filed on Jan. 31, 2014, now Pat. No. 9,556,863.

(51) Int. Cl.
*B05B 9/06* (2006.01)
*F04B 43/12* (2006.01)
(Continued)

(52) U.S. Cl.
CPC .............. *B05B 9/042* (2013.01); *B05B 9/007* (2013.01); *B05B 9/0406* (2013.01); *B05B 9/06* (2013.01);
(Continued)

(58) Field of Classification Search
CPC .......... F04B 23/02; F04B 41/02; F04B 43/12; F04B 43/1215; F04B 43/086; F04B 17/06;
(Continued)

(56) References Cited

U.S. PATENT DOCUMENTS 2,703,256 A 3/1955 Mascaro
2,757,044 A * 7/1956 Gerbracht ........... A01M 7/0089 239/10

(Continued)

OTHER PUBLICATIONS

Wheel Spray Precision Applicators, Wheel Spray Corp., print out from www.wheelspray.com, 2013.

(Continued)

*Primary Examiner* — Philip E Stimpert

(74) *Attorney, Agent, or Firm* — Woods Oviatt Gilman LLP; Katherine H. McGuire, Esq.

(57) ABSTRACT

A sprayer system having a trailer, which is pulled by a tractor or other tow body, and has a tank carrying liquid to be sprayed and a spray head. The trailer has a peristaltic pump mounted on a frame and driving pumping power from the wheels of the trailer so that the sprayer is self pumping when the trailer is pulled. The peristaltic pump provides a smooth flow by providing a multiplicity of pulses of liquid produced by the pump from the rotation of the trailer wheels by wrapping the compressible tube of each pump around an assembly of rollers which are rotated by drive wheels. The tube is wrapped at least 360° around the rollers and is held stationary by being connected to fixed outlet and inlets of each pump. The tube lies side by side on at least one of the rollers of each assembly and overlaps that roller.

9 Claims, 12 Drawing Sheets

(51) Int. Cl.
*F04B 53/10* (2006.01)
*B05B 9/04* (2006.01)
*B05B 9/00* (2006.01)

(52) U.S. Cl.
CPC .......... *F04B 43/12* (2013.01); *F04B 43/1215* (2013.01); *F04B 53/10* (2013.01)

(58) Field of Classification Search
CPC ...... F04B 43/08; F04B 43/1292; A01C 7/102; B05B 9/06; B05B 9/042; B05B 9/0406; B05B 9/007
USPC .......................................................... 222/614
See application file for complete search history.

(56) References Cited

U.S. PATENT DOCUMENTS

| | | | | | |
|---|---|---|---|---|---|
| 2,885,967 | A | * | 5/1959 | Vogel .................. | F04B 43/1215 417/477.13 |
| 2,975,940 | A | | 3/1961 | Nybakke | |
| 3,266,728 | A | | 8/1966 | Hallberg | |
| 3,429,266 | A | * | 2/1969 | Jones, Jr. .............. | F04B 43/113 128/DIG. 3 |
| 3,489,393 | A | * | 1/1970 | Waraksa ............. | B01F 11/0042 356/39 |
| 3,534,533 | A | | 10/1970 | Luoma | |
| 3,807,605 | A | | 4/1974 | Meharry et al. | |
| 4,224,882 | A | * | 9/1980 | Cruse ...................... | A01C 7/004 111/120 |
| 4,240,583 | A | * | 12/1980 | Hughes ................... | B05B 9/007 222/613 |
| 4,296,875 | A | * | 10/1981 | Borglum ............. | A01B 69/022 222/214 |
| 4,356,934 | A | | 11/1982 | Knake | |
| 4,473,188 | A | | 9/1984 | Ballu | |
| 4,483,486 | A | | 11/1984 | Magda | |
| 5,109,791 | A | | 5/1992 | Matsumoto et al. | |
| 5,333,795 | A | | 8/1994 | Jessen | |
| 5,364,030 | A | | 11/1994 | Murdock et al. | |
| 5,988,435 | A | | 11/1999 | Edwards | |
| 7,124,961 | B2 | | 10/2006 | Wilting | |
| 8,602,324 | B2 | | 12/2013 | Kendall et al. | |
| 2004/0069140 | A1 | * | 4/2004 | Able ................... | F04B 43/0009 92/98 R |
| 2010/0140374 | A1 | | 6/2010 | Kendall et al. | |
| 2014/0056728 | A1 | | 2/2014 | Kendall et al. | |

OTHER PUBLICATIONS

Hummert International, Wheel Spray Push-type Sprayers, print out from www.hummert.com/product-details/28596/wheel-spray-push-type-sprayers, 2013.

* cited by examiner

PERISTALTIC PUMP AND TRAILER MOUNTED SELF PUMPING SPRAYER SYSTEM INCORPORATING SAME

This application is a continuation of U.S. patent application Ser. No. 14/170,138, filed Jan. 31, 2014, which is incorporated herein by reference.

FIELD OF THE INVENTION

The present invention relates to trailer mounted, self pumping sprayers using peristaltic pumps which are driven by the wheels of the trailer. The wheels provide drive power to the pumps, thereby enabling the spraying to be carried out without additional pumping means, such as either separately powered electrically or mechanically driven pumps carried on the trailer.

BACKGROUND OF THE INVENTION

Most trailer carried spraying systems use separate independently driven electrical or mechanical pumps which are carried by the trailer. Such spraying systems are shown for example in the following U.S. Pat. No. 2,757,044 (Gerbracht), U.S. Pat. No. 2,975,940 (Nybakke), and U.S. Pat. No. 7,124,961 (Wilting).

It has been proposed to use the power from the tractor or other tow body to drive the pump for the sprayer system, and self pumping spraying systems using peristaltic pumps connected to the trailer drive wheels have been proposed. See the following U.S. Pat. No. 2,703,256 (Mascaro), U.S. Pat. No. 3,534,533 (Luoma), U.S. Pat. No. 3,807,605 (Meharry et al.), U.S. Pat. No. 4,240,583 (Hughes), U.S. Pat. No. 4,296,875 (Borglum), U.S. Pat. No. 4,483,486 (Magda), U.S. Pat. No. 4,473,188 (Ballu), U.S. Pat. No. 5,109,791 (Matsumoto et al.) and U.S. Pat. No. 5,333,795 (Jessen). Such peristaltic pump equipped sprayers have not achieved commercial acceptance. It is believed this is because the spray is pumped in widely spaced pulses, rather than in a generally steady flow of liquid, as have been provided by separate electrical and mechanically driven pumps.

SUMMARY OF THE INVENTION

It is an object of the present invention to provide an improved peristaltic pump and to utilize such pump in a spraying system in order to provide the outlet pressurized fluid from the pump to be delivered to a spray head more steadily and consistently, approaching a delivery of pressurized fluid to a spray head that would have otherwise required separate mechanical and electrical pumps.

Another object of the present invention is to provide an improved trailer towed spraying system which utilizes a peristaltic pump, and preferably two such pumps, which provides a greater number of pulses per rotation of the wheels of the trailer than has heretofore been achieved.

Briefly described, in accordance with the invention, there is provided a peristaltic pump having a compressible pumping tube disposed along a generally circular path extending over 360° along rollers. The rollers which compress the tube engage parallel side by side regions of the tube which are wrapped around a path including the rollers, thereby providing additional compression of the tube on each revolution of the rollers about the drive axis of the pump.

It has been found that even an overlap of a single roller produces about 25% greater number of pulses of liquid being pumped by the peristaltic pump than with conventional peristaltic pumps. The flow of liquid is therefore steadier and more like the flow which is obtained with conventional electric or mechanical pumps. Accordingly, the advantages of a peristaltic pump, as well as the elimination of additional pumping means in a self pumping spraying system, is achieved through the use of the invention.

Preferably the peristaltic pump has a rotatable drive shaft, where the rollers are mounted in an assembly on the drive shaft for rotation about an axis of rotation of the drive shaft. Such assembly may have a frame with inlet and outlet ends of the tube connected to said frame for holding the tube stationary and helically wrapped around and in engagement with the rollers. For example, three rollers may be provided each having axes of rotation parallel to the axis of rotation of the drive shaft, in which the rollers are circumferentially spaced 120° apart around the axis of the drive shaft. As the rollers rotate with rotation of the drive shaft, the rollers move along the tube moving liquid when contained in the tube from its inlet to outlet ends. The inlet end of the pump is in fluid communication (e.g., tube, hose, or other connection) with a source of liquid, such as a tank, while the outlet end of the pump is in fluid communication (e.g., tube, hose, or other connection) to a valve selectable between returning fluid to the source of liquid or to an outlet port, such as provided by a spray head to a discharge nozzle.

The present invention further provides a spraying system incorporating one or two of the above-described peristaltic pumps, so as to provide a greater number of pulses per revolution of a drive shaft operating the pump than in peristaltic pumping systems heretofore proposed.

The improved peristaltic pump which, although specially adapted for use in a spraying system which is mounted on a trailer for towing by a tractor or other tow body, may also find uses wherever peristaltic pumps have heretofore been used, especially where a smoother flow of liquid from the pump is desired.

BRIEF DESCRIPTION OF THE DRAWINGS

The foregoing and other object features and advantages of the invention will become more apparent from a reading of the following description in connection with the accompanying drawings in which.

DETAILED DESCRIPTION OF THE INVENTION

Figure 1:
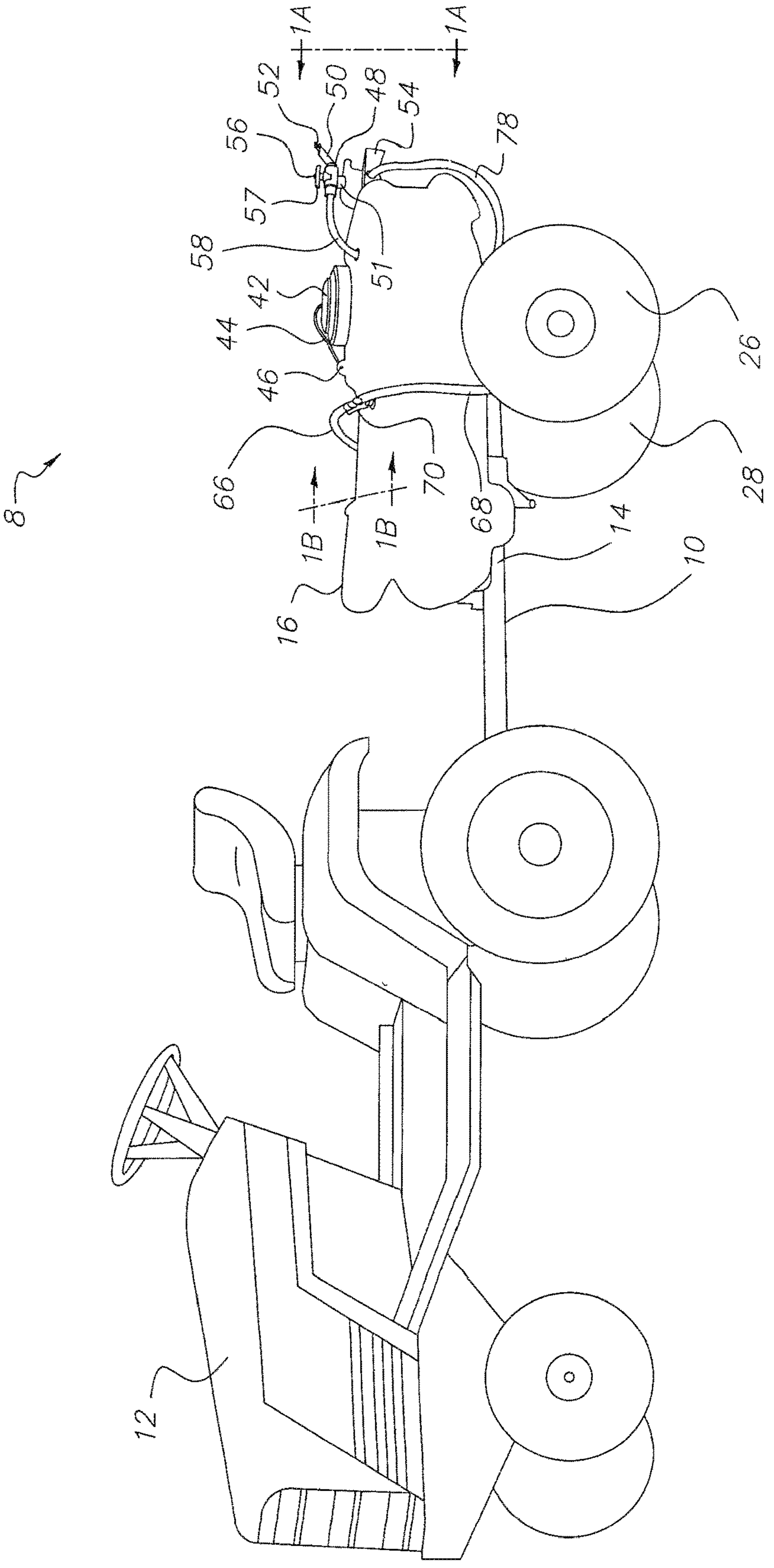
FIG. 1 is a perspective, elevational view of a trailer mounted spraying assembly or system in accordance with the invention shown for example being pulled by a tractor.

Referring more particularly to the drawings, there is shown in FIG. 1 a trailer mounted self pumping sprayer system 8 having a trailer 10 that is attached to be pulled by a tractor 12. The trailer 10 is an assembly of a frame 14, a tank 16 mounted upon frame 14, a spraying assembly 48 along the back of the trailer, peristaltic pumps 62 and 64 (FIGS. 3-8) for pumping fluid from tank 16 to the spraying assembly 48, and wheels 26 and 28. As will be described later in more detail, such peristaltic pumps are powered by rotation of wheels 26 and 28.

A cap 42 covers a port for filling tank 16 with liquid, which may be water containing a herbicide or pesticide solution or any other liquid used for agricultural purposes, such as irrigation and the like. Cap 42 is tethered to the top of tank 16 by a line 44, which is attached at one end to the center of the cap and at the other end to a bracket extending from the tank as shown at 46.

Figure 1A:
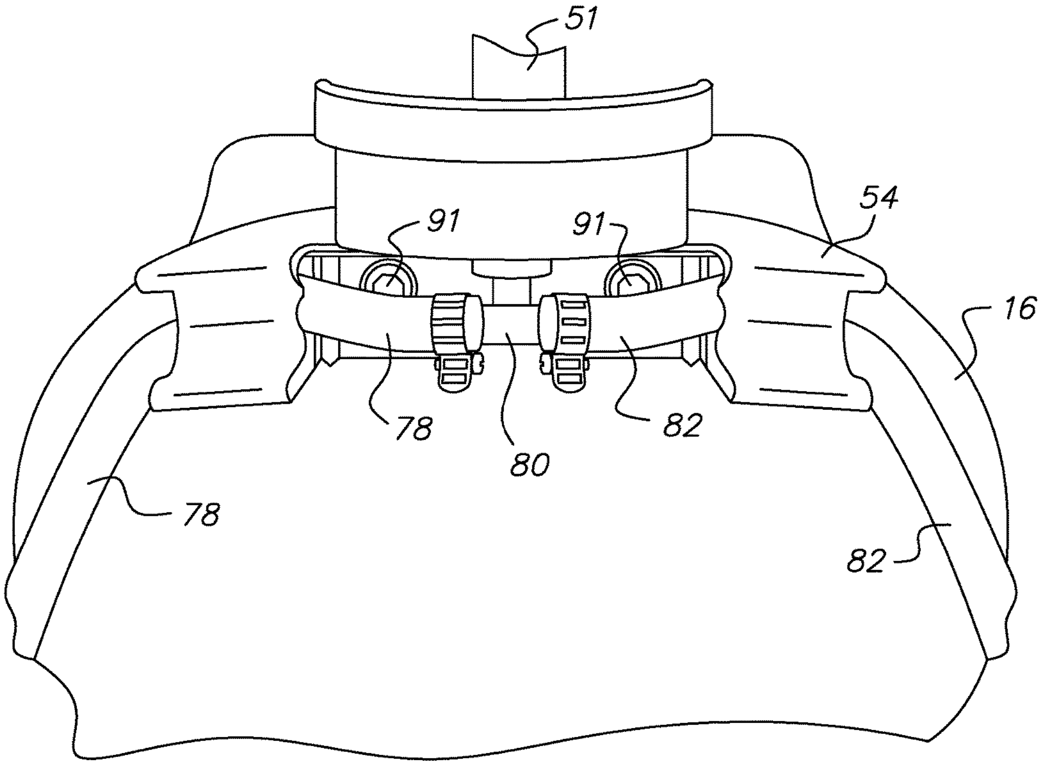
FIG. 1A is an end view of the trailer assembly of FIG. 1 broken away to show the connection of the hoses to the spray head, the view being taken in the direction of the arrows 1A-1A in FIG. 1.
Figure 1B:
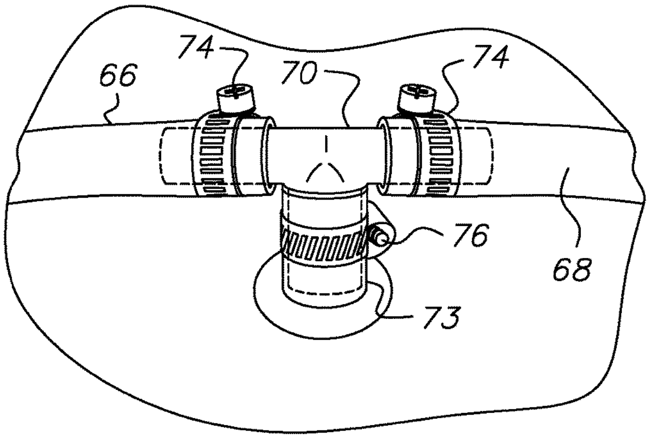
FIG. 1B is a fragmentary perspective view taken in the direction of arrows 1B-1B in FIG. 1, and showing the connection of the inlet hoses to the interior of the tank.
Figure 1C:
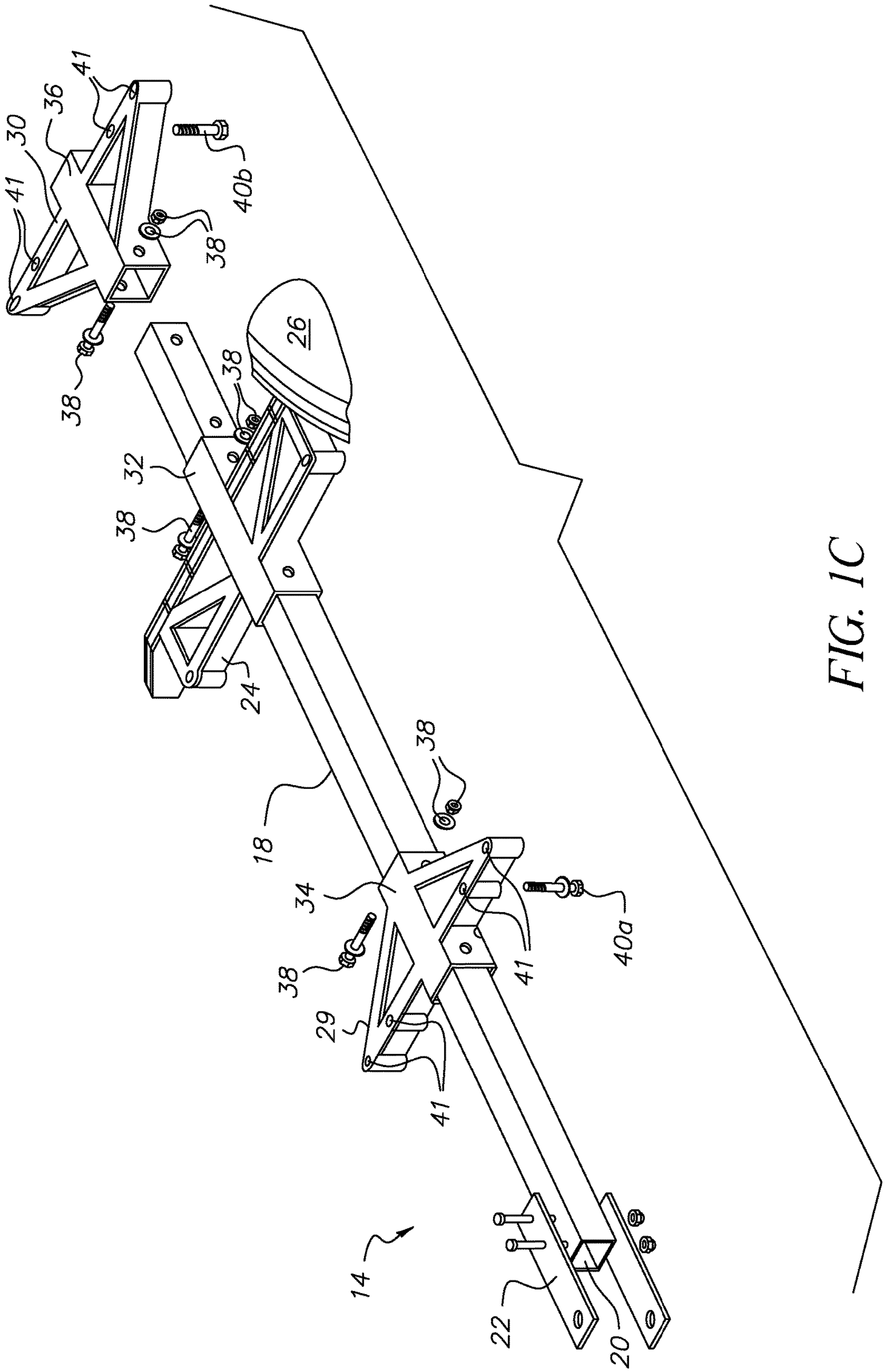
FIG. 1C is a perspective exploded view of the frame of the trailer assembly of FIG. 1 on which the tank is mounted.

As best shown in FIG. 1C, the trailer frame 14 has a main beam 18 with a forward end 20 which is attached to a hitching assembly 22, such as typically used for coupling a trailer to the back of a trailer as used in agriculture or the like. Axle frame member 24 is attached to beam 18 by a box like sleeve 32. Front and back frame members 29 and 30 are attached to beam 18 using similar shaped sleeves 34 and 36, respectively. These frame members 24, 29, and 30 are each bolted to the main beam 18 by bolt assemblies 38. Trailer wheel 26 and 28 are journalled in axle frame member 24 by being attached to ends 25 of axle frame member 24 by their receptive axles 90 (FIGS. 4, 5, 6, and 8), so that the wheels spin around their axles as trailer 10 is pulled. Preferably, axles 90 are provided by bolts threaded through washers 27 into blind threaded holes 23 at frame ends 25 (see FIG. 8), but other mechanisms for mounting wheels 26 and 28 to ends 25 of axle frame member 24 enabling rotation about their axles may be used. Trailer wheel 26 and 28 may be, for example, typical wheels as used on tractor pulled trailers for agriculture, but other types of wheels may be used than shown in the figures.

Tank 16 is attached to the front and back frame members 29 and 30 by bolts 40*a* and 40*b* which extend through holes 41 in such frame members. For purposes of illustration only two bolts 40*a* and 40*b* are shown. Tank 16 is preferably of molded plastic having threaded openings for receiving bolts 40*a* and 40*b*.

Figure 2:
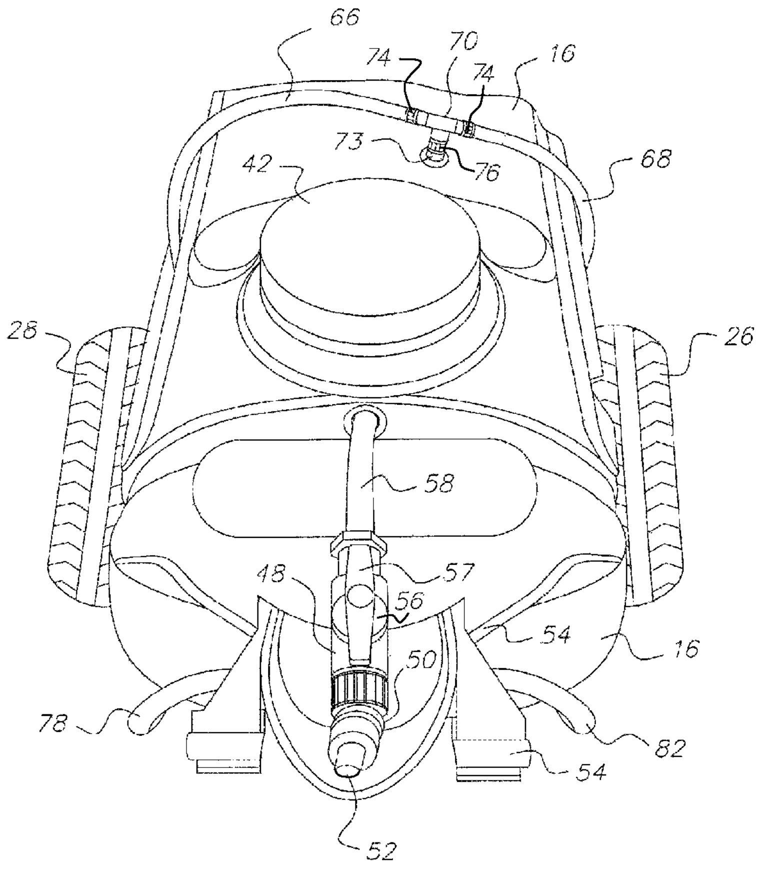
FIG. 2 is a partial perspective view looking downwardly at the top of the trailer assembly of FIG. 1 from the rear end thereof showing the spray head assembly.

As shown in FIGS. 1 and 2, spraying assembly 48 is attached to the back of tank 16 and includes a spray head 50, a discharge nozzle 52, and a two-way valve 56. The discharge nozzle 52 is angled upwardly so that spray of liquid from the nozzle extends downwardly towards the ground away from the rear end of the tank 16, as shown in FIG. 2. The spray head 50 is supported on a mounting fixture 54 which is received at the rear of tank 16 and attached thereto. Fixture 54 is preferably of molded plastic that attaches to the back end of the tank 16 by means of fasteners, such as bolts 91 (FIG. 1A). Therefore the entire spray head assembly 48, including the piping to the spray head, is supported by the fixture without the need for additional brackets.

Two-way valve 56 has a knob 57 that can be turned to select either hose 58, or nozzle 52, to be in fluid communication with a tube 51 through which fluid is provided to spraying assembly 48. Two-way valve 56 with a knob 57 which may be turned from the OFF position, as shown in FIG. 2, to an ON position in order to direct the liquid which is pumped from the tank out of the spraying nozzle 52 of the head 50. The knob 57 can be manually turned so as to direct the fluid being pumped while the trailer is being towed by the tractor 12 through hose 58 back into the tank 16. Thus, spraying can be discontinued by turning knob to its OFF position while the trailer 10 is towed and pumping is on going. The pumped liquid is then returned to the tank via the valve 56 and the hose 58. Intermediate positions between full ON and OFF positions of knob 57 can control rate of fluid output via nozzle 52, if desired.

The pair of improved peristaltic pumps 62 and 64 of system 8 are shown in FIGS. 3, 3A, 4, 5, 6, 7 and 8. The use of a pair of peristaltic pumps, one for each of the wheels 26 and 28 of the trailer 10 is preferred, however the spraying system can operate with only one peristaltic pump. These pumps 62 and 64 are connected to inlet hoses 66 and 68, respectively, as will be described in more detail below. Hoses 66 and 68 connect with a hose 73 that extend into the tank through a "T" connector 70, as shown in FIGS. 1, 1B, and 2. The "T" connector 70 is connected to the hoses 66 and 68 by clamps 74, and connected to hose 73 by a clamp 76, as shown in FIG. 1B. Hose 73 extends into tank 16 to pick up the liquid therein near the bottom of the tank.

Figure 4:
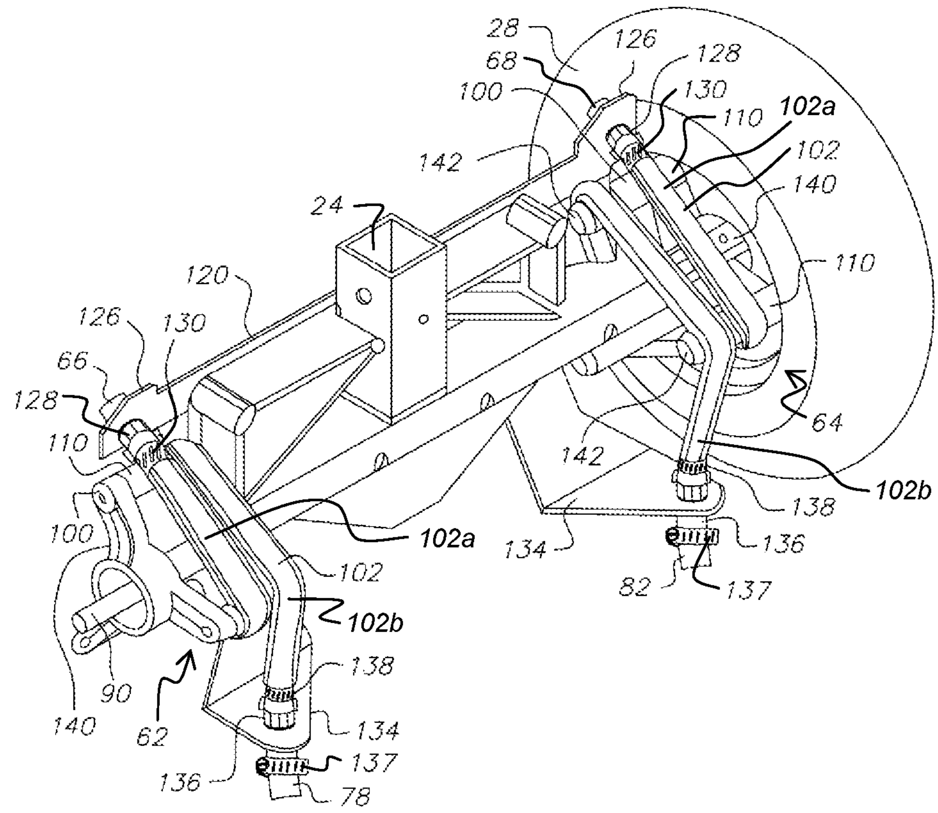
FIG. 4 is another fragmentary, perspective view of the rear end of the trailer assembly of FIG. 1 with the axle frame member turned upward toward the vertical and showing the bracket plate attached to the axle frame member and to couplings connected to the inlet and outlet ends of the compressible tubes of the peristaltic pumps as well as how the compressible tubes are wrapped around the roller assemblies of the pumps.

The outlet hoses 78 and 82 are coupled to the outlet ends of the pumps 62 and 64, respectively, as best shown in FIG. 4. Hose 78 and 82 connect to tube 51 of the spraying assembly 48 by a "T" connector 80, such as by clamps similar to those used with connector 70. The outlet hoses 78 and 82 from pumps 62 and 64, respectively, each extend through fixture 54 to "T" connector 80, as shown in FIG. 1A.

Figure 3:
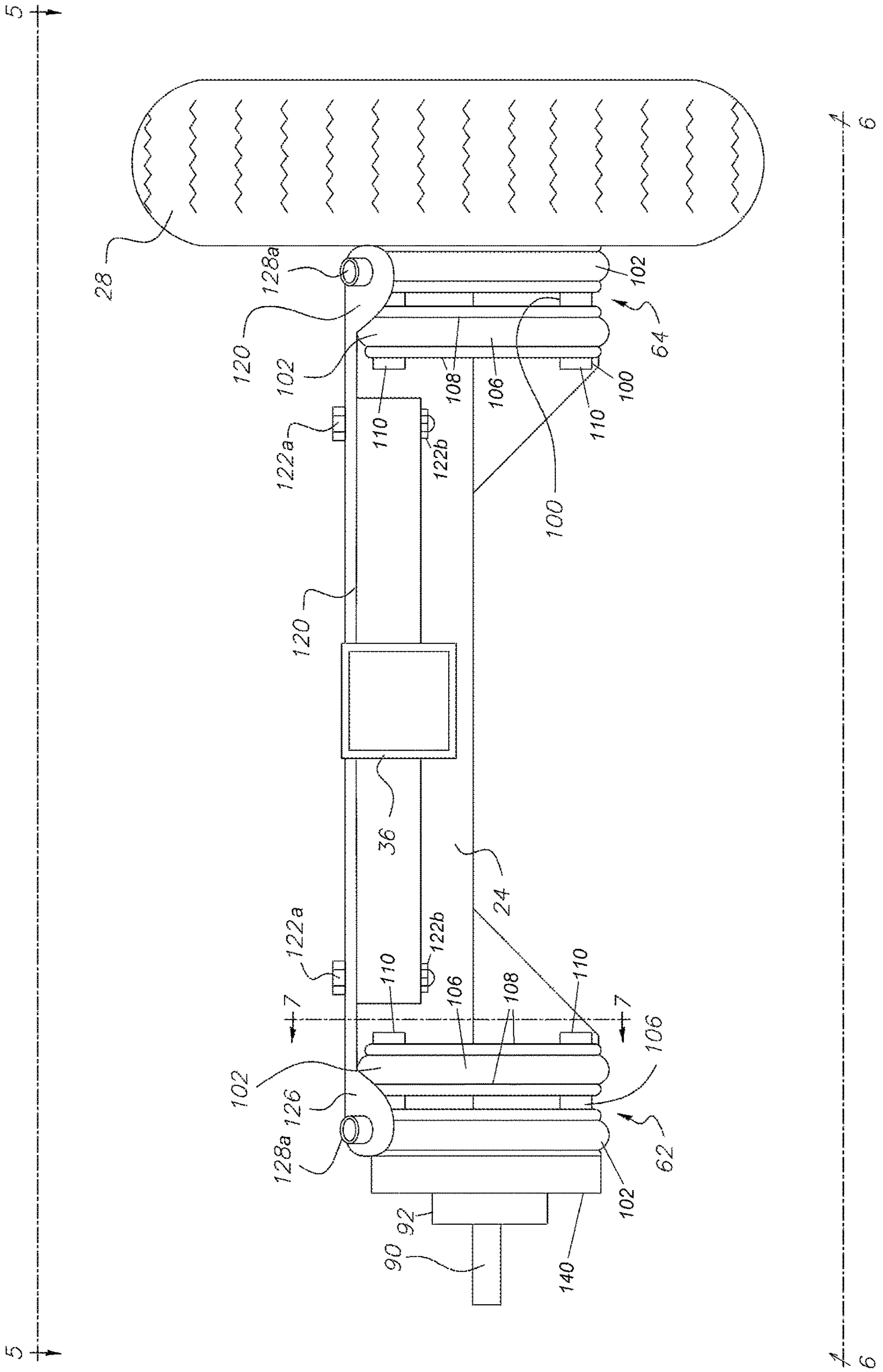
FIG. 3 is an end view from the rear of the trailer assembly of FIG. 1 in which only the right side wheel is shown and the tank and outlet hoses are not illustrated to simplify the illustration.
Figure 3A:
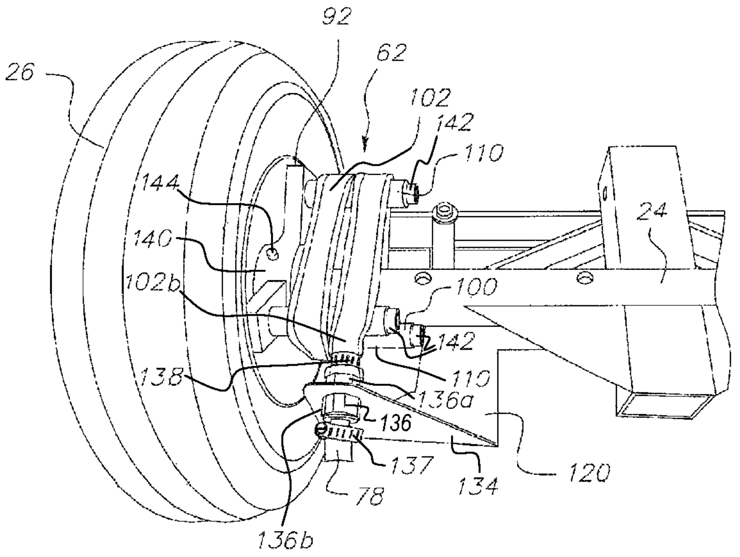
FIG. 3A is a perspective, fragmentary view of the trailer assembly of FIG. 1 looking downwardly from the rear end of the trailer assembly, and from which the tank and its associated attachments have been removed, so as to illustrate the peristaltic pump which is connected to and driven by the left side, wheel of the trailer.

Wheels 26 and 28 are mounted for rotationally movement about their respective axles 90, as shown in FIGS. 4, 5, 6, and 8. These wheels 26 and 28 provide drive shafts (or drive wheels) for the peristaltic pumps 62 and 64, respectively, being effectively connected to the pumps, either directly, or to wheel hubs 92 which rotate around axle 90, as shown in FIG. 3A. This connection to wheel hubs 92 is made by means of the roller assemblies 100 of the pumps 62 and 64 as will be described in greater detail hereinafter. The inward cylindrical portion of the hub 92 is also shown in FIG. 3 with the rest of the left wheel hub and wheel 26 removed.

Referring to FIGS. 3-8, where the peristaltic pumps 62 and 64 are best illustrated, the pumps are similar and each have three components, namely roller assembly 100 of rollers 110, a compressible tube 102 of elastomeric material wrapped helically around rollers 110, and means for maintaining tube 102 stationary or fixed to the frame, particularly to axle frame member 24.

Figure 9:
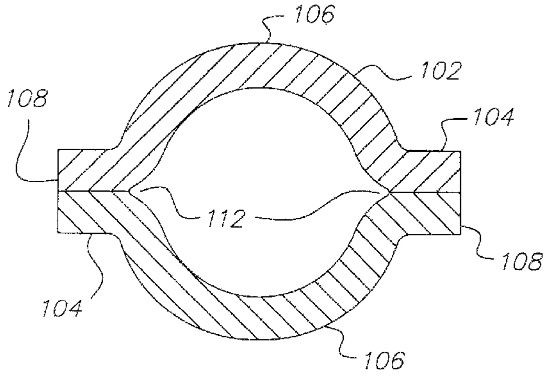
FIG. 9 is a sectional view through the compressible tube used in the peristaltic pumps prior to compression thereof.
Figure 10:
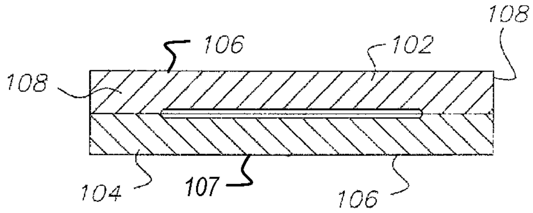
FIG. 10 is a sectional view showing the tube compressed, the section being taken along the line 10-10 in FIG. 11.
Figure 11:
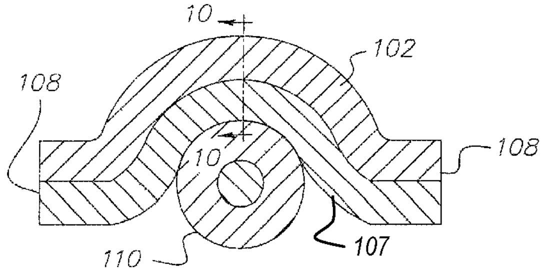
FIG. 11 is a sectional view showing a compressible tube opposed partially around one of the rollers of the roller assembly and being compressed such roller as it rotates around the drive axle of the peristaltic pump.

Tube 102 is shown in FIG. 9 and FIG. 10 in compressed and non-compressed states, respectively. Tube 102 has two sides (or central arcuate or tubular sections) 104 that are joined to each other along the edges thereof providing side flanges 108. The flanges 108 provide stability for the tube 102 on the rollers 110 of the roller assembly 100. In each pump 62 and 64, as the rollers 110 rotate along the stationary tube 102, they progressively compress the tube 102 (FIG. 10) so that the sides of the tubes come together in a sealing relationship, as shown in the cross-section of FIG. 11, thereby generating a succession of pulses of liquid out of the peristaltic pump. These liquid pulses are driven to the outlet end 102*b* of the tube 102 and through the outlet hoses 70 and 82 to the spray head 50. The arrangement of flanges 108 guides outer surface 106 of sides 104 of tube 102 into sealing relationship which is facilitated by notches 112 (FIG. 9) formed on the inside of tube 102 where two sides 104 meet the at opposing flanged sections 108. Notches 112 in the interior of tube 102 allow it to flatten completely when the rollers 110 pass across the outer surface 107 as shown in FIGS. 10 and 11. This greatly improves suction in the tube by limiting any bypass of fluid by completely closing the interior diameter of the tube when compressed. Tube 102 of each of the pumps 62 and 64 are flexible and compressible elastomeric material, which is compatible with the liquid being pumped. For an agricultural sprayer which may handle pesticides and herbicides, EDPM plastic material has been found suitable. For example, tube 102 with such configuration shown in FIG. 9 may be manufactured by Pawling Engineered Products, of Pawling, N.Y., U.S.A., and believed designed for use as weather stripping or door seals rather than for pumping fluid there through.

Figure 7:
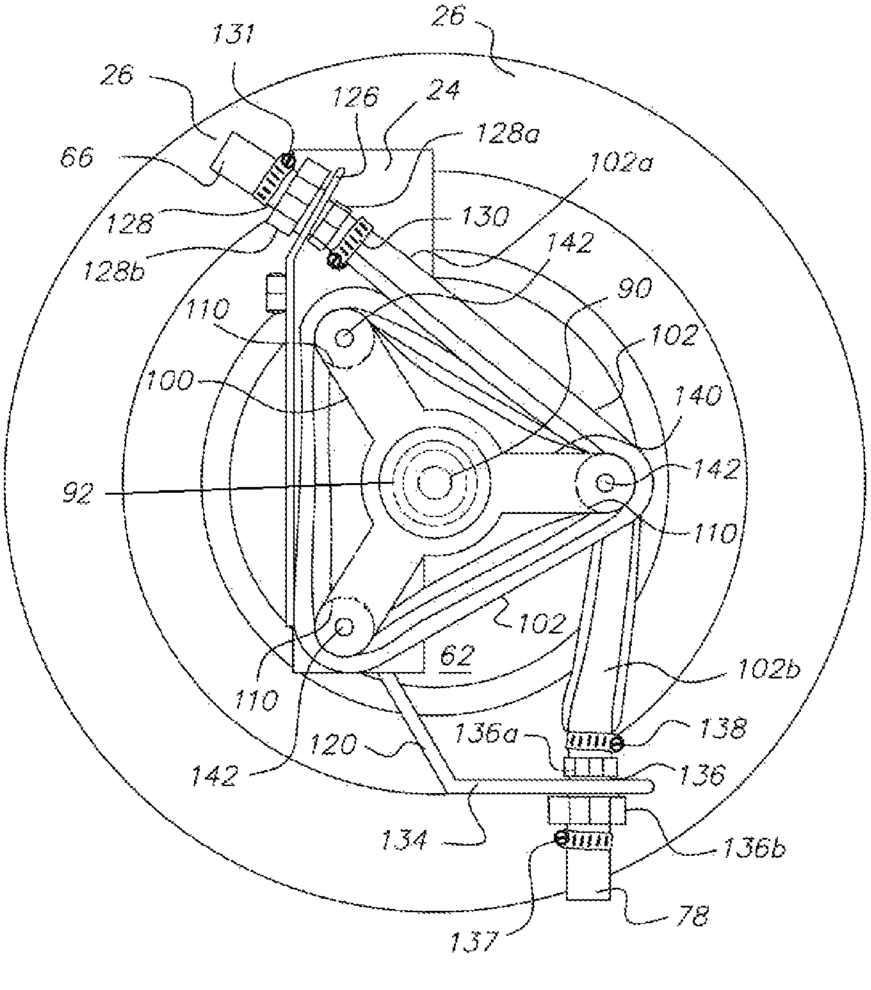
FIG. 7 is a sectional view along the line 7-7 in FIG. 3, taken in the direction of the arrows and showing one of the trailer's wheels with associated peristaltic pump at the left hand side of the trailer assembly of FIG. 1, such view illustrating one of the roller assemblies on which the rotatable rollers are mounted which is connected to the drive shaft provided by the hub of the wheel.
Figure 8:
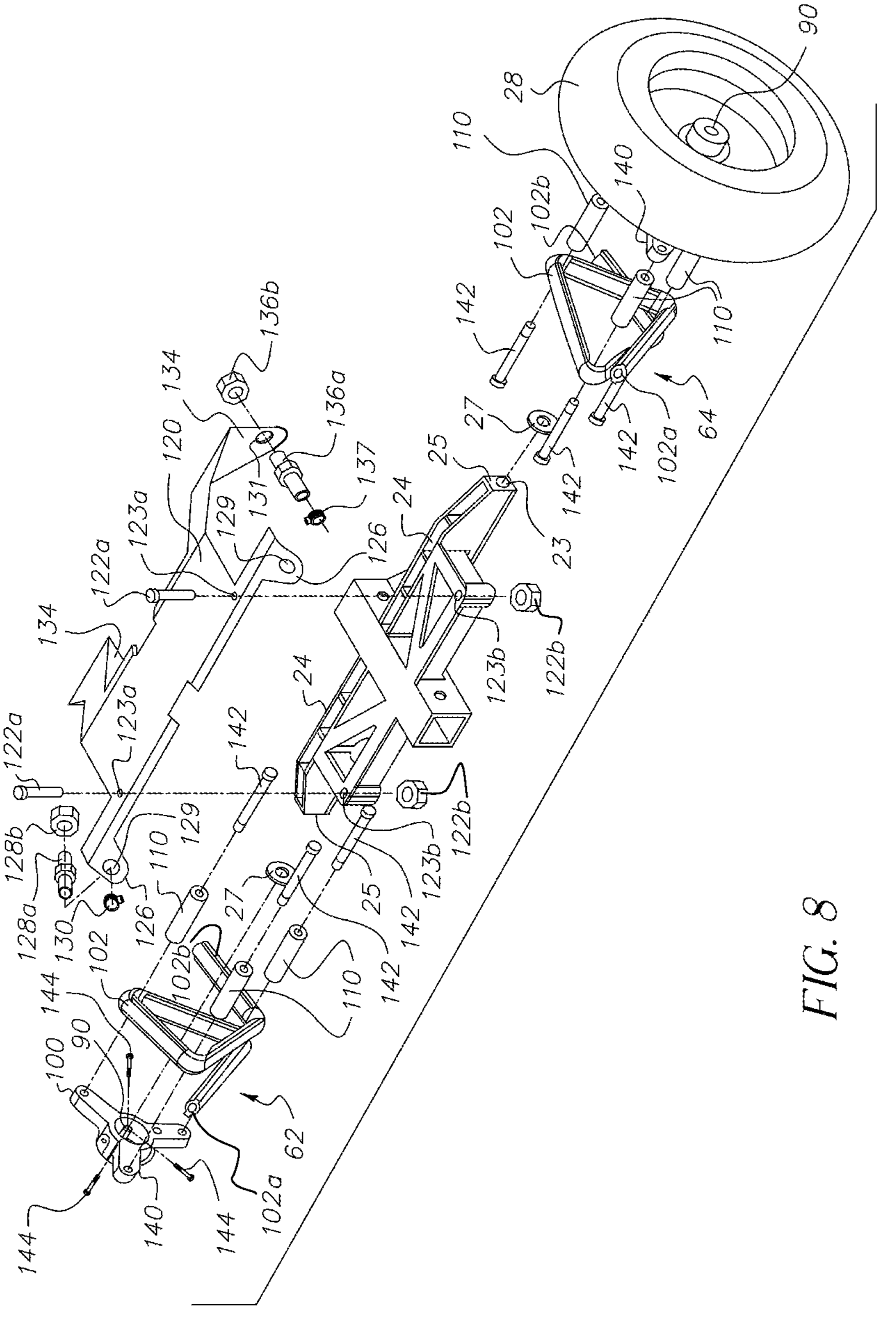
FIG. 8 is an exploded view of the axle frame member of the trailer assembly of FIG. 1 taken along the bottom view, and the bracket attached thereto in which couplings attached to the ends of the compressible tubes of the peristaltic pumps for holding them stationary with respect to the rotatable roller assembly.

The means for maintaining the compressible tube 102 stationary fixed to the axle frame member 24 is provided by a bracket plate 120 attached to the axle member 24 by bolts 122*a* retained by nuts 122*b* after such bolts extend through holes 123*a* and 123*b* in plate 120 and frame member 24, respectively, as shown in FIG. 8. This plate 120 has two end flaps 126 each with a tube stub 128 projecting therefrom (see FIGS. 4 and 7). As best shown in FIG. 7, tube stub 128 for example may be a typical tube stub having a tubular portion 128*a* with an enlarged hexagonal section, and a locking nut 128*b*. The tubular portion 128*a* extends through a hole 129 (FIG. 8) of the plate 120 along the inside thereof until stopped by its larger diameter hexagonal section, and a locking nut 128*b* extend over the tubular portion 128*a* along the outside of plate 120. The tubular portion 128*a* is externally threaded to such extent enabling the locking nut 128*b* to retain or fix the tube stub 128 to plate 120. The end of the tube stub 128 along the underside of flap 126 is coupled by compressive hose clamp 130 to inlet end 102*a* (FIG. 8) of hose 102, and the other end of the tube stub 128 along the outside of flap 126 is coupled a compressive hose clamp 131 to one of the inlet hose 66 or 68. In this manner, tube 102 of each of pumps 62 and 64 are in fluid communication with respective inlet hoses 66 and 68 so that such pumps when in operation pull fluid into the tube from tank 16.

The bracket plate 120 also has at the opposite end thereof, flaps 134 having tube stubs 136 extending there from (see FIGS. 4 and 7). The outlet end 102*b* of the tube 102 of each pump 62 and 64 is connected by a hose clamp 138 to its respective stub tube 136 on the inside of the flaps 134. The outlet hoses 78 and 82 are connected by hose clamps 137 to the tube stubs 136 on the outside of the flaps 134. Tube stubs 136 each have tubular portion 136*a* and locking nut 136*b*, and operate the same as tube stubs 128 as described above, with respect to holes 131 (FIG. 8) through flaps 134 to retain or fix tube stubs 136 to plate 120. For purposes of illustration, only one of the inlet couplings provided by tube stub 128, and only one of the outlet coupling 136, are shown in FIG. 8. Accordingly, each of tubes 102 of peristaltic pumps 62 and 64 are held stationary by being anchored to the frame member 24 by tube stubs 128 and 136, respectively.

The roller assembly 100 associated with each of wheels 26 and 28 is made up of a spanner 140 as shown in FIG. 7. Spanner 140 holds rollers 110 equally spaced from the axle 90 of the wheel. The rollers 110 are also 120° apart from each other, and mounted on bolts 142, such as shoulder bolts, attached to spanner 140. These bolts 142 define rotational axes for rollers 110. Rollers 110 may be plastic cylinders, such as of polyurethane, and freely rotate along their respective bolts 142, which may be of metal or other rigid material. These rotational axes are parallel to the rotational axis extend longitudinally through axle or shaft 90. Spanner 140 is attached to a cylindrical inwardly extending portion of wheel hub 92 by set screws 144 (see FIGS. 3A and 8). An example of hub 92 relative to spanner 140 is shown in FIG. 7 without set screws 144. The dimension of wheel hub 92 may be different than shown and depends on the particular wheel (or other rotational drive shaft) onto which the pump is being mounted. Accordingly, rotation of wheels 26 and 28 causes rotation of the rollers 110 of the roller assemblies 100 along the left and right sides frame 24. Optionally, the bolts 142 could extend directly to the wheel or hub wall without spanner 140, or use other mounting fixture which rotates with the wheel, so long as bolts are positioned so that rollers 110 roll along the stationary tube 102 with wheel rotation.

Figure 5:
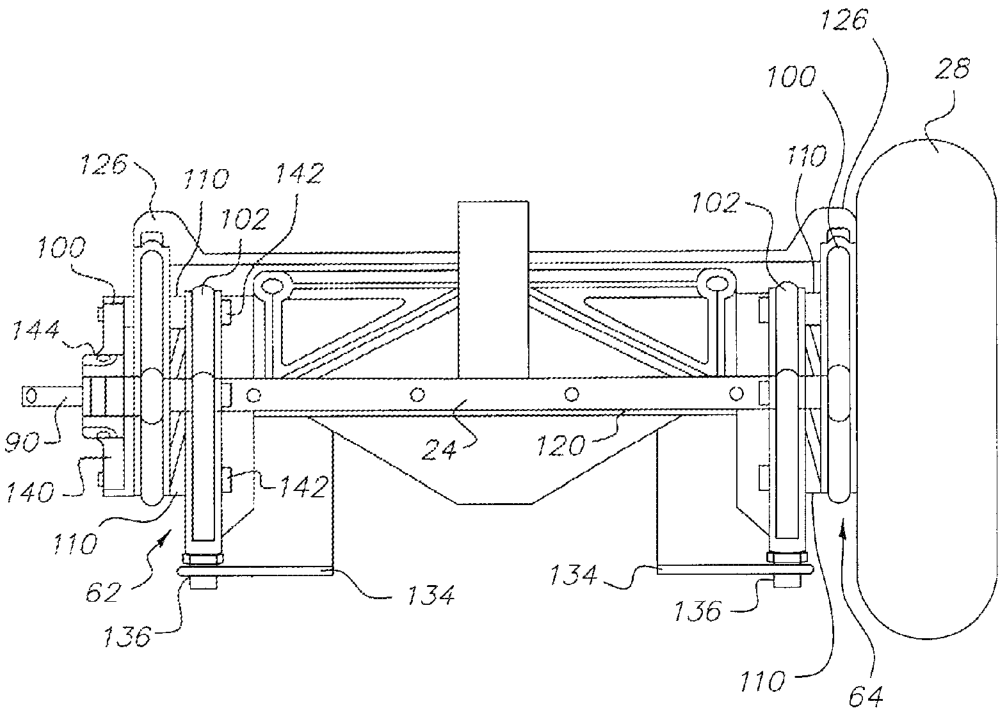
FIG. 5 is a plan view in the direction of the arrows 5-5 in FIG. 3 taken downwardly and showing the assembly of the axle frame member, the wheel on the left side being removed to illustrate the drive mechanism for the rollers on which the tube of the peristaltic pump on the left side of the trailer assembly is wrapped.
Figure 6:
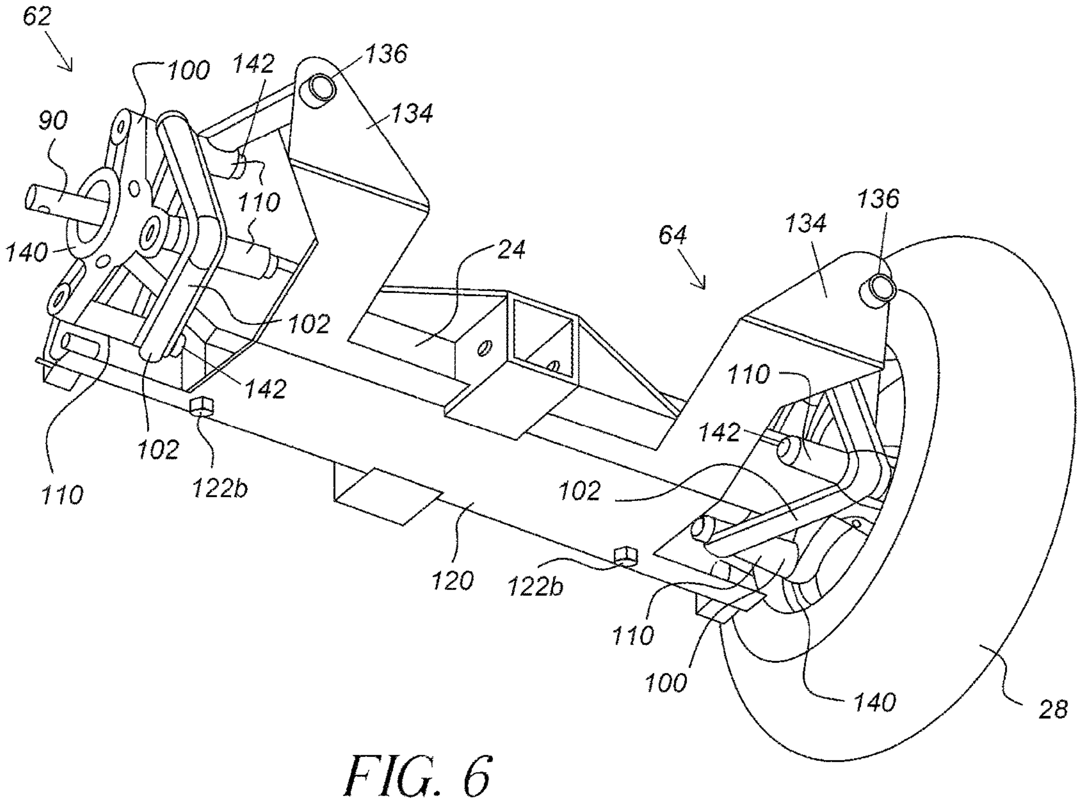
FIG. 6 is a partial perspective view in the direction of the arrows 6-6 in FIG. 3 taken upwardly from the bottom, and showing the axle frame member with the bracket plate attached thereto, but illustrating only one wheel on the right side to the trailer assembly as viewed from the rear; and also showing the peristaltic pumps on either end of the axle frame member, and their assemblies for mounting rotatable rollers while the peristaltic pump compression tubes are held stationary.

Each pump 62 and 64 has its respective tube 102 wrapped helically around the rollers 110 of the pump as shown in FIGS. 4 and 5. The tube 102 is wrapped slightly more than 360° around the three rollers 110 of the pump so that progressive parts of the tube 102 overlap at least one roller 110 as the rollers are rotated with the wheel coupled to the pump. Accordingly, at least one pair of pulses is generated in the tube 102 of each pump 62 and 64 on each rotation of their respective wheels 26 and 28 as they turn and drive the pumps 62 and 64 at their respective set of rollers 110 where the tube 102 overlaps and rests in side by side relationship. The pulses progress successively to the outlet end of the tube 102 of pumps 62 and 64 and into the outlet hoses 78 and 82, respectively.

The greater the number of pulses generated in the peristaltic pump per rotation of the roller assembly, the smoother the flow of the liquid through the pump and into the outlet hose of the pump. The pumps 62 and 64 therefore provide a substantially constant spray from the spray head 50, i.e., via their respective outlet hoses 78 and 82, connector 80, tube 51, valve 56 (when knob 57 is in an ON position) from the spray head 50. The tubes 102 being helically wrapped around the three 120° spaced apart rollers 110 with a wrap of greater than 360° provides an important improvement in the design and operation of the peristaltic pump, which is especially adapted for use in sprayers so that the spray from the sprayer is substantially more constant than with conventional peristaltic pumps. Slower operating speed (MPH) of the self-pumping sprayer system 10 may be used, since more pulses of liquid per revolution of the trailer wheels 26 and 28 are provided for by the improved peristaltic pumps 62 and 64.

Thus, as the roller assemblies 100 of rollers 110 rotate with the drive wheels 26 and 28, at least two pulses of liquid are pumped from tank 16 where the tubes 102 overlap the rollers 110 thereby providing an extra pulse of liquid through the tubes and increasing the number of pulses per rotation of the drive wheels. The extra pulses smooth the flow of liquid from the peristaltic pump to provide for a steady continuous spray.

Although tube stubs 128 and 136 are described to fix stationary the inlet end 102*a* and outlet end 102*b*, respectively, of tube 102 with respect to plate 120, other mechanisms or clamps may be used to hold in place tube 102 so that tube 102 stays in place with respect to the rollers 110 as they rotate along the tube 102 with rotation of drive shaft provided from wheels (e.g., their hubs 92) to push fluid through tube 102.

Further, although a peristaltic pump 62 or 64 are described for trailer mounted self pumping sprayer system 8 for towing by a tractor 12 or other tow body, such pump may be used in other applications where a peristaltic pump is desired to be powered from rotational motion of a drive shaft.

From the foregoing description it will be apparent and has been provided an improved peristaltic pump, and a trailer mounted self pumping sprayer system incorporating same. Variations and modifications in the herein described systems and in the pump will undoubtedly suggest themselves to those skilled in the art. Accordingly the foregoing description should be taken as illustrative and not in a limiting sense.

What is claimed is:

1. A peristaltic pump sprayer system configured to provide a steady continuous spray of a liquid, the system comprising:

- a frame having a tank for containing the liquid to be sprayed, and two wheels mounted to said frame upon respective axles to enable independent rotation of said wheels from each other, said axles having a common axis of rotation;
- a first set of rollers being rotationally driven by the independent rotation of a first wheel of said two wheels;
- a second set of rollers being rotationally driven by the independent rotation of a second wheel of said two wheels;

- a first bracket plate mounted to said frame adjacent said first set of rollers;
- a second bracket plate mounted to said frame adjacent said second set of rollers,
- wherein each of said first and second bracket plates includes a first planar end flap arranged in non-parallel relation with respect to an opposing second planar end flap;
- a first compressible tube having an inlet end mounted to said first planar end flap of said first bracket plate and in communication with the liquid in said tank and an outlet end mounted to said second planar end flap of said first bracket plate, wherein said first compressible tube is wrapped around in compressive engagement with said first set of rollers which when rotated pumps the liquid from said inlet end to said outlet end of the first compressible tube; and
- a second compressible tube having an inlet end mounted to said first planar end flap of said second bracket plate and in communication with the liquid in said tank and an outlet end mounted to said second planar end flap of said second bracket plate, wherein said second compressible tube is wrapped around in compressive engagement with said second set of rollers which when rotated pumps the liquid from said inlet end to said outlet end of the second compressible tube;
- wherein each respective tube operates to provide the pumped liquid independent from the other, and the liquid that exits said outlet end of said first compressible tube combines with the liquid that exits said outlet end of said second compressible tube along an outlet hose to a spray head to provide the steady continuous spray.

2. The sprayer system according to claim 1 further comprising:

- a return hose to said tank; and
- a two-way valve having on and off positions for manually selectively connecting said outlet hose to said return hose or to said spray head, wherein in said off position said two-way valve is operable to discontinue spraying via said spray head, and in said on position said two-way valve is operable to discontinue flow via said return hose.

3. The sprayer system according to claim 1 wherein said first and second sets of rollers each comprise three rollers.

4. The sprayer system according to claim 3 wherein the rollers of each of said first and second sets of rollers are circumferentially spaced from the other rollers of the respective set and successively engage and compress their respective tube to pump the liquid in a plurality of pulses along said respective tube.

5. The sprayer system according to claim 3 wherein each of said first and second tubes first helically wraps 360 degrees around its respective set of rollers to provide compressions along the tube equal to the number of the rollers with each revolution of said respective set of rollers, and then further wraps greater than 360 degrees and less than 720 degrees around its respective set of rollers to provide at least one additional compression along the respective tube with each said revolution, wherein at each of said compressions and said additional compression said tube is sealed closed.

6. The sprayer system according to claim 3 wherein the rollers of each of said sets of rollers are circumferentially spaced 120° apart around their respective axle.

7. The sprayer system according to claim 1 wherein the rollers of each of said first and second sets of rollers have axes of rotation parallel to an axis of rotation of their respective wheel.

8. A peristaltic pump for a sprayer comprising a compressible tube mounted to a bracket plate on a frame, said compressible tube having inlet and outlet ends and which carries liquid being pumped through said tube from said inlet end to said outlet end, said tube extending in a path around a plurality of rollers circumferentially spaced from each other, said rollers configured to rotate about an axis of rotation to successively engage and compress said tube to pump the liquid in a plurality of successive pulses along the tube, wherein said tube is wrapped helically around the rollers so that said tube is disposed in side by side relationship on at least one of said rollers intermediate said path, said inlet end is anchored at a first planar end flap of said bracket plate, said outlet end is anchored at a second planar end flap of said bracket plate, wherein the first planar end flap and second planar end flap are arranged in non-parallel relation with respect to one another.

9. The peristaltic pump according to claim 8 wherein said rollers number three and are circumferentially spaced 120° apart around a drive shaft that rotates said rollers along said tube.

* * * * *